United States Patent
Schermann et al.

(10) Patent No.: US 12,281,045 B2
(45) Date of Patent: Apr. 22, 2025

(54) METHODS FOR RECLAIMING GYPSUM PANELS THAT CONTAIN HYDROPHOBIC MATERIALS AND USE THEREOF

(71) Applicant: KNAUF GIPS KG, Iphofen (DE)

(72) Inventors: Rudy A. Schermann, El Centro, CA (US); Annamaria Vilinska, Chicago, IL (US); Alfred Li, Naperville, IL (US); Blair C. Walker, Timmins (CA); Te Hua Lau, Glenview, IL (US); Stephen P. Erickson, Imperial, CA (US); Jose Luis Carrazco, Imperial, CA (US); Angel Arturo Rueda, El Centro, CA (US)

(73) Assignee: KNAUF GIPS KG, Iphofen (DE)

( * ) Notice: Subject to any disclaimer, the term of this patent is extended or adjusted under 35 U.S.C. 154(b) by 676 days.

(21) Appl. No.: 17/210,789

(22) Filed: Mar. 24, 2021

(65) Prior Publication Data
US 2021/0331978 A1 Oct. 28, 2021

Related U.S. Application Data

(60) Provisional application No. 63/016,540, filed on Apr. 28, 2020.

(51) Int. Cl.
| | |
|---|---|
| C04B 28/14 | (2006.01) |
| B28B 19/00 | (2006.01) |
| C04B 18/167 | (2023.01) |
| C04B 24/42 | (2006.01) |
| C04B 38/10 | (2006.01) |
| C04B 111/00 | (2006.01) |

(52) U.S. Cl.
CPC .......... *C04B 28/14* (2013.01); *B28B 19/0092* (2013.01); *C04B 18/167* (2013.01); *C04B 24/42* (2013.01); *C04B 38/10* (2013.01); *C04B 2111/0062* (2013.01)

(58) Field of Classification Search
CPC . B28B 19/0092; C04B 18/167; C04B 20/008; C04B 2111/0062; C04B 22/143; C04B 24/226; C04B 24/42; C04B 28/14; C04B 28/145; C04B 38/10; Y02W 30/91
See application file for complete search history.

(56) References Cited

U.S. PATENT DOCUMENTS

| | | |
|---|---|---|
| 4,645,548 A | 2/1987 | Take et al. |
| 5,683,635 A | 11/1997 | Sucech et al. |
| 6,494,609 B1 | 12/2002 | Wittbold et al. |
| 10,570,062 B2 | 2/2020 | Piwowarski |
| 2008/0090068 A1* | 4/2008 | Yu |
| 2008/0160340 A1 | 7/2008 | Stocco et al. |
| 2016/0214895 A1 | 7/2016 | Van Strien et al. |
| 2016/0236978 A1 | 8/2016 | Piwowarski |
| 2016/0375655 A1* | 12/2016 | Li et al. |
| 2020/0055277 A1* | 2/2020 | Hemphill ................ B32B 29/06 |
| 2020/0255335 A1 | 8/2020 | Herfurth et al. |
| 2021/0188712 A1 | 6/2021 | Gehrig et al. |

FOREIGN PATENT DOCUMENTS

| | | |
|---|---|---|
| CN | 111454037 A | 7/2020 |
| CZ | 33058 U1 | 7/2019 |
| EP | 0811585 A1 | 12/1997 |
| EP | 2030693 B1 | 3/2009 |
| EP | 2641886 A2 | 9/2013 |
| EP | 3187474 A1 | 7/2017 |
| FR | 3059662 A1 | 6/2018 |
| JP | S60171261 A | 9/1985 |
| JP | H08325045 A | 12/1996 |
| JP | 09165244 A | 6/1997 |
| JP | H09142915 A | 6/1997 |
| JP | H09142917 A | 6/1997 |
| JP | 2010013304 A | 1/2010 |
| JP | 2010514593 A | 5/2010 |
| JP | 2015522505 A | 8/2015 |
| JP | 2016536159 A | 11/2016 |
| JP | 2017149595 A | 8/2017 |
| JP | 2019025696 A | 2/2019 |
| JP | 2020502036 A | 1/2020 |
| JP | 2021500307 A | 1/2021 |
| RU | 2381902 C2 | 2/2010 |
| WO | 0212141 A1 | 2/2002 |

(Continued)

OTHER PUBLICATIONS

Machine translation of CZ33057U1, Jul. 2019, Tesarek.*

(Continued)

*Primary Examiner* — Philip C Tucker
*Assistant Examiner* — Jimmy R Smith, Jr.
(74) *Attorney, Agent, or Firm* — Vorys, Sater, Seymour and Pease LLP; Pradip Sahu; Philip T. Petti

(57) ABSTRACT

A method for making a gypsum board including:
  combining a first plurality of particles including at least about 50 wt. % calcium sulfate dihydrate and about 0.05 wt. % to about 10 wt. % hydrophobic material and having a D50 particle size of about 200 µm to about 800 µm with a second plurality of particles including calcium sulfate hemihydrate to form a combined mixture of calcium sulfate;
  adding water to the combined mixture of calcium sulfate to make an aqueous gypsum slurry;
  depositing a core layer including the aqueous gypsum slurry over a forming surface; and
  allowing the core layer to set, thereby forming a set gypsum core.

21 Claims, 4 Drawing Sheets

(56) References Cited

FOREIGN PATENT DOCUMENTS

| WO | 2006020369 A2 | 2/2006 |
| WO | 2009064602 A1 | 5/2009 |
| WO | 2013174951 A1 | 11/2013 |
| WO | 2019001677 A1 | 1/2019 |
| WO | 201981344 A1 | 5/2019 |
| WO | 2019081344 A1 | 5/2019 |

OTHER PUBLICATIONS

International Search Report and Written Opinion mailed Sep. 17, 2021.
ASTM D6913-04, Standard Test Methods for Particle-Size Distribution (Gradation) of Soils Using Sieve Analysis, Abstract, updated May 18, 2017.
ASTM DE6913/D6913M-17, Standard Test Methods for Particle-Size Distribution (Gradation) of Soils Using Sieve Analysis, Abstract, updated Feb. 15, 2021.
What is calcined gypsum powder? What are some uses of it in agriculture?, Quora, URL:<https://www.quora.com/What-is-calcined-gypsum-powder-What-are-some-uses-of-it-in-agriculture>, retrieved from the Internet Jan. 3, 2024.
Office Action issued Jun. 18, 2024 in RU Application No. 2022127662 for United States Gypsum Company.
Japanese Patent Ofice, Japanese Notice of Reasons for Refusal issued Jan. 24, 2025, in Japanese Patent Applicaton No. 2022-558500 filed Apr. 7, 2021, 4 pages.
Pasona Group Inc., Search Report by Registered Search Organization (Machine Translation), issued Jan. 31, 2025, in Japanese Patent Application No. 2022-558500 filed Apr. 7, 2021, 16 pages.

* cited by examiner

METHODS FOR RECLAIMING GYPSUM PANELS THAT CONTAIN HYDROPHOBIC MATERIALS AND USE THEREOF

RELATED APPLICATION

The present application claims priority to U.S. Provisional Application No. 63/016,540 filed on Apr. 28, 2020, hereby incorporated by reference.

FIELD OF THE INVENTION

The present disclosure relates to methods of reusing gypsum board waste.

BACKGROUND OF THE INVENTION

In the construction of buildings, one of the most common building elements is gypsum boards, also known as gypsum paneling, gypsum building panels, gypsum panels, or wallboard, used in the construction of walls and/or ceilings. Walls made from gypsum wallboard are traditionally constructed by affixing the panels to wood studs or metal framing, and treating the joints between adjoining panels with a specially prepared adhesive called a joint compound. Gypsum panels easily accommodate walls that are unusual in size and can be shaped around structural elements such as beams or pipes. The side edges of the drywall panels are tapered, thus allowing the joint compound to be applied to the seam, between adjoining panels, in such a way that a monolithic surface is created when finished.

The gypsum board is primarily made of gypsum as opposed to cement boards which are primarily a cement, such as Portland cement. In particular, gypsum boards are primarily composed of calcium sulfate dihydrate. The gypsum boards are made by reacting water and stucco (calcium sulfate hemihydrate) such that the calcium sulfate hemihydrate sets to form calcium sulfate dihydrate (gypsum). Stucco is made by calcining gypsum, and it is typically comprised primarily of calcium sulfate hemihydrate and can also contain calcium sulfate anhydrite. The calcium sulfate hemihydrate is produced by calcination of calcium sulfate dihydrate to partially dehydrate the calcium sulfate dihydrate.

When stucco is mixed with water, calcium sulfate hemihydrate particles react, rehydrating to become set gypsum. The manufacturing method of the gypsum panels typically involves depositing an aqueous gypsum slurry (e.g., a mixture containing stucco and water). Optionally, one or more additives may be added to the slurry. Additives may include, for example, retarders, accelerators, foaming agents, wet strength enhancing materials, biocides, sag resistant ingredients, cellulosic fibers, glass fibers, fire retarding materials, binders, water repellency ingredients, dust mitigators, starches, as well as other ingredients or enhancing materials that are known in the art. The slurry is typically deposited onto a moving continuous facer sheet of paper or fibrous mat, then covering the slurry with another facer sheet of paper or fibrous mat, such that the aqueous gypsum slurry, that will form the gypsum core, is sandwiched between the two facing materials. To reduce the overall weight of the finished gypsum board, air may be incorporated as bubbles or air pockets into the aqueous gypsum slurry resulting in a gypsum board having a foamed or bubbled gypsum core having air voids (also called air bubbles). The gypsum slurry is allowed to set (e.g., to form an interlocking matrix of calcium sulfate dihydrate, referred to as set gypsum) to produce a solid article prior to being cut into panels and sent to a kiln for final drying. The produced gypsum board may be further processed, as is known in the art, and then bundled, and made ready for shipment.

Gypsum board comes in many different types and sizes to meet specific construction needs, such as gypsum exterior sheathing building panel, tile backer board, or interior drywall. For example, moisture resistant drywall may be manufactured for use in applications where the drywall may be exposed to water, such as in bathrooms or in outdoor applications. During installation of gypsum board in the building industry, waste materials are generated.

Gypsum boards may enter the solid waste stream in several different locations. These include the manufacturing facility, new construction sites, renovation activities, and when a building is demolished or deconstructed. Debris from construction sites may be encountered as large pieces that can be somewhat easily removed from the other debris components. Methods for reclamation of gypsum from gypsum board are known.

Methods for producing gypsum boards are well-known. For example, Published European patent application EP 2 641 886 A2 describes a gypsum powder containing hemihydrate gypsum powders and type H anhydrous gypsum powders. The type H anhydrous gypsum is obtained by calcining dihydrate gypsum recovered from gypsum board waste. EP 2 641 886 A2 describes further that a part of the type II anhydrous gypsum may be replaced by dihydrate. Also, this dihydrate may be obtained from recycling material. Powders of gypsum board waste are obtained by pulverizing board waste and passing the pulverized product through a sieve to remove the board papers.

EP 2 030 693 B1 also describes recycling of gypsum products in which devices (such as sieves) are provided in order to separate the paper waste from the rest of the gypsum product waste.

Published Patent Cooperation Treaty application WO 2009/064602 A1 describes wet grinding a dihydrate together with a specific dispersant. The ground gypsum is to be used for cosmetics, paper or coatings as a filler. However, WO 2009/064602 A1 is not related to recycling of gypsum product waste.

Published Patent Cooperation Treaty application WO 2019/001677 A1 (Knauf GIPS KG) discloses a method of producing a gypsum slurry for forming gypsum products, in particular gypsum boards, preferably gypsum paper boards, comprising the steps of: a) providing a gypsum paper product comprising a gypsum and a paper component, in particular a gypsum paper board, and/or broken parts thereof; b) wet grinding the gypsum paper product and/or the broken parts thereof containing at least parts of the paper component to form a wet ground gypsum paper component. Its method disintegrates (grinds) the gypsum paper product together with the paper component (i.e, without a previous removal of the paper component). It also includes (directly) feeding the preferably (non-calcined) ground material into a gypsum slurry for forming (new) gypsum products.

In another method for reclamation of gypsum from gypsum board, after separating the gypsum core, the board is typically ground to a particle size of about 300 μm or less (e.g., D50 of about 10 μm to 200 μm, for example 10 μm to 60 μm) then calcined to dehydrate the calcium sulfate dihydrate to calcium sulfate hemihydrate. This calcium sulfate hemihydrate may then be reused in new product.

U.S. Pat. No. 10,570,062 discloses a method for producing a gypsum plasterboard wherein bundler dust which is added to the gypsum slurry is obtained from the production process of impregnated plasterboards using a hydrophobic agent, namely silicone oil.

Published Patent Cooperation Treaty application WO 2019/081344 A1 teaches a recycled gypsum with a foaming agent which is at least one alpha-sulfofatty acid di-salt for reducing the wet density of the composition with a recycled gypsum content of at least 0.5 wt. %.

Japanese Patent Application Publication No. JP09165244 A discloses gypsum plasterboard material which contains 3 wt. % or less of a pulverized waste gypsum material. The pulverized waste gypsum material is ground by the grinding energy of from 3-15 kw/gypsum board waste such that there is 1.0-4.0 $m^2$/g BET specific surface area.

U.S. Patent Application Publication 2016/0214895 discloses a method and apparatus for recycling gypsum board which includes grinding the raw material into chunks, crushing the material further in a rolling mill which will reduce material sizes as well as partially knock gypsum off its backing paper. Material is then screened such that only gypsum material is then deposited into a hopper prior to a mixer assembly which mixes the various sizes of recycled gypsum into a consistent mixture prior to passing such material into a roll press subsystem for densifying such material to produce material of known and uniform composition suitable for cement manufacturing. Reclaimed gypsum in this specific physical form factor may then be used in significant portions as replacement for virgin gypsum in cement manufacture. The method and apparatus are applicable to the recycling of both new and renovation gypsum-based building material.

While the above-described processes are relatively straightforward, the reclamation process becomes difficult when recycling gypsum boards comprising gypsum and hydrophobic materials, such as siloxanes. Attempts to recycle siloxane-containing gypsum, for example, have been unsuccessful as the siloxane-containing gypsum particles interfere with the setting process of the gypsum, especially when the incorporation of air bubbles in the gypsum board structure is desired. The siloxane-containing gypsum particles interfere with the incorporation of air bubbles (foaming) in the gypsum slurry. Thus, these gypsum board products are not usually recyclable and are discarded as waste.

Therefore, there is a need in the art to develop improved methods of gypsum reclamation from gypsum boards, particularly in recycling gypsum materials that contain hydrophobic components.

SUMMARY

Embodiments of the invention provides a method for making a gypsum board comprising:
combining water, a first plurality of particles comprising at least about 50 wt. % calcium sulfate dihydrate and about 0.05 wt. % to about 10 wt. % hydrophobic material and having a particle size distribution with a D50 particle size of about 200 µm to about 800 µm, as determined using ASTM D6913-17 Method B, and a second plurality of particles comprising calcium sulfate hemihydrate and optionally one or more additives to make an aqueous gypsum slurry;
depositing a core layer comprising the aqueous gypsum slurry over a forming surface; and
allowing the core layer to set, thereby forming a set gypsum core.

Inventive embodiments typically comprise:
combining a first plurality of particles comprising at least about 50 wt. % calcium sulfate dihydrate and about 0.05 wt. % to about 10 wt. % hydrophobic material and having a D50 particle size of about 200 µm to about 800 µm, with a second plurality of particles comprising calcium sulfate hemihydrate to form a combined mixture of calcium sulfate;
adding water to the combined mixture of calcium sulfate to make an aqueous gypsum slurry;
depositing a core layer comprising the aqueous gypsum slurry over a forming surface; and
allowing the core layer to set, thereby forming a set gypsum core.

A gypsum board is a gypsum product having a board shape (i.e., being in particular, at least substantially flat). The gypsum board typically has a rectangular shape.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
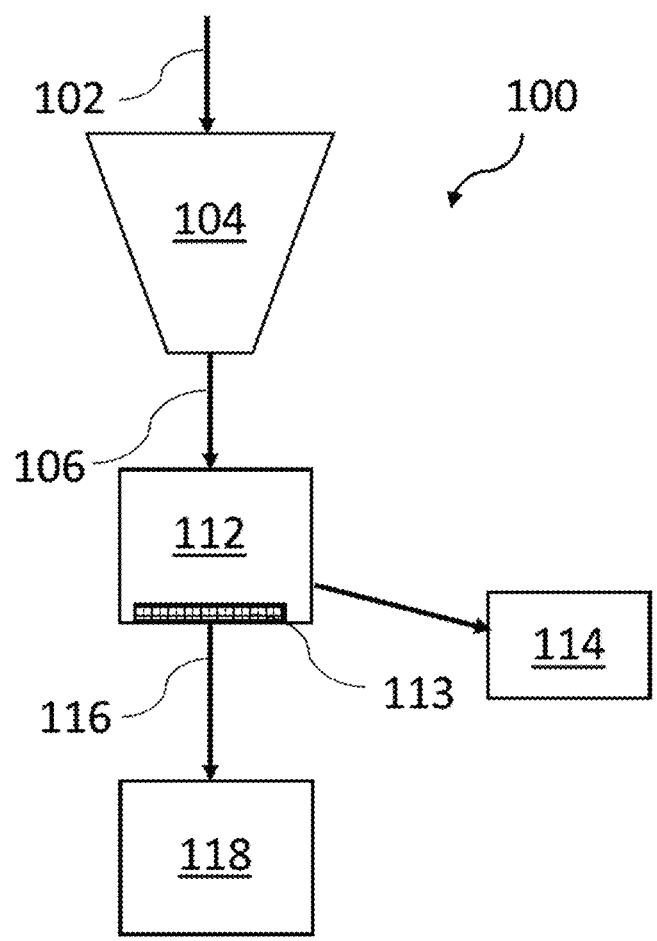
FIG. 1 provides one process by which waste gypsum material may be processed to a D50 particle size of about 200 µm to 800 µm for use as reclaimed gypsum.

The present invention comprises methods that may be used to recycle waste gypsum materials, such as gypsum boards. The waste gypsum boards may comprise hydrophobic materials, such as used in applications to improve moisture resistance of the gypsum board.

In the present description, drywall, used in the construction of interior walls and ceilings (interior wallboard), will be exemplified as a non-limiting example of the waste gypsum material and the product to be made from the recycled gypsum. Drywall for purposes of this specification is defined as a panel (also known as board) comprising a core of calcium sulfate dihydrate, typically with additives, typically between sheets of front and back facer sheets. Typically the facer sheets are made of paper or glass fiber mats, but facer sheets of other fibrous sheets may be employed. However, the processes disclosed herein may be used to process and reclaim gypsum from any gypsum board having a core layer of gypsum-containing material and to produce a building product of any gypsum board having a core layer of gypsum-containing material.

One of skill in the art would be able to modify the methods described herein to process waste gypsum materials from interior wallboard having a gypsum core between paper facer sheets, exterior sheathing gypsum panels, gypsum tile backer board, or other gypsum building panels. For example, a typical gypsum exterior sheathing panel for processing according to the invention may comprise, from front to back, a first fibrous mat, a gypsum core layer having front and rear surfaces, the gypsum core layer having a thickness of about 0.25 inches to about 1.25 inches, preferably about 0.25 inches to about 1 inch, wherein the first fibrous mat is attached as a facer cover sheet to the front surface of the gypsum core layer, a second fibrous mat attached as a backer cover sheet to the rear surface of the gypsum core layer. The gypsum core layer comprises more than about 50 wt. % calcium sulfate dihydrate, preferably at least about 75 wt. % more preferably at least about 85 wt. %. The first fibrous mat and second fibrous mat may comprise paper or fibrous material (e.g., one or more of polymer fibers, glass fibers, and mineral fibers).

Waste gypsum materials may be obtained from a variety of sources. Non-limiting examples include waste from a manufacturing facility, waste from new construction sites, renovation waste, and waste from building demolition or deconstruction. In general the waste gypsum materials comprise gypsum-containing material, typically a layer or core, and one or more facer sheets. Waste gypsum materials comprising calcium sulfate dihydrate include gypsum board, for example, interior drywall, exterior sheathing panels, and tile backer board. Also, waste materials comprising gypsum include specialty gypsum board products that may comprise fiberglass-reinforced gypsum cores or be externally coated with fiberglass to strengthen the board and enhance moisture resistance. Waste material comprising calcium sulfate dihydrate may also comprise components such as fibrous woven or unwoven layers comprising paper, glass fibers, mineral fibers, polymers or the like. In particular, the gypsum board generally has a gypsum core and front and back facer sheets of paper, non-woven fibrous mat, or fiber mesh. The fibers of the non-woven fibrous mat or fiber mesh are typically glass fibers, mineral fibers or polymer fibers, most typically glass fibers. Generally the core layer of the waste gypsum material is more than 50 wt. % gypsum.

In one aspect, the present invention includes a process for converting waste gypsum materials comprising a hydrophobic additive into gypsum suitable for reuse in new gypsum building materials. The resulting new gypsum building material comprises up to 10 wt. %, up to 20 wt. %, up to 30 wt. %, up to 40 wt. %, up to 50 wt. %, up to 60 wt. %, up to 70 wt. %, up to 80 wt. %, up to 90 wt. % waste gypsum materials Such a method may comprise providing a coarse waste gypsum material comprising pieces of gypsum board or other waste gypsum materials, wherein gypsum containing material of the coarse waste gypsum material comprises more than about 50 wt. % calcium sulfate dihydrate (e.g., gypsum) and about 0.05 wt. % to about 10 wt. % of at least one hydrophobic additive. Preferably the amount of calcium sulfate dihydrate in the coarse waste gypsum material is at least about 75 wt. %, more preferably at least about 85 wt. %. Then this coarse waste gypsum material is processed to generate a first plurality of particles comprising the hydrophobic additive and calcium sulfate dihydrate. The first plurality of particles has a D50 particle size of about 200 μm to about 800 μm. Particle sizes may be determined simply by passing the materials through sieves of appropriate sizes, as is well known in the art. Particle size distribution (e.g., D50) may be determined using means known in the art as well. For example, one non-limiting example is disclosed in ASTM D6913/D6913M-17 Method B, Standard Test Methods for Particle-Size Distribution (Gradation) of Soils Using Sieve Analysis.

The hydrophobic material additives in the waste gypsum material may be a coating on the outer surface of the gypsum core and/or may be a component within the gypsum core such that the first plurality of particles comprises up to about 10 wt. %, for example about 0.05 wt. % to about 10 wt. % or about 1 wt. % to about 5 wt. %, of the hydrophobic material. Thus, by weight, a solid layer of gypsum core in the waste gypsum material may comprise up to about 10 wt. %, for example about 0.05 wt. % to about 10 wt. % or about 1 wt. % to about 5 wt. %, of the hydrophobic material. For example, a lower limit of hydrophobic material may be about 0.05 wt. %, about 0.1 wt. %, about 0.5 wt. %, or about 1 wt. % of the gypsum-containing material. For example, an upper limit of hydrophobic material may be about 2 wt. %, about 5 wt. %, about 7 wt. %, or about 10 wt. % of the gypsum-containing material. Typical hydrophobic materials are siloxane or waxes. Thus, the hydrophobic additive in the waste gypsum material may be, for example, a siloxane-containing component. Hydrophobic materials tend to repel water, fail to mix with water, and/or have limited wettability with water. It is the opposite of a hydrophilic material which has a tendency to mix with, dissolve in, and/or be wetted by water.

In another aspect, embodiments of the present invention includes a process for using reclaimed gypsum comprising a hydrophobic additive to manufacture gypsum board. Such a method may comprise:

combining water, a first plurality of particles comprising at least about 50 wt. % calcium sulfate dihydrate and about 0.05 wt. % to about 10 wt. % hydrophobic material and having particle size distribution with a D50 particle size of about 200 μm to about 800 μm, and a second plurality of particles comprising calcium sulfate hemihydrate to make an aqueous gypsum slurry;

depositing a core layer comprising the aqueous gypsum slurry over a forming surface; and allowing the core layer to set, thereby forming a set gypsum core.

Typically the first plurality of particles comprising calcium sulfate dihydrate (non-calcined reclaimed gypsum) is about 0.1 wt. % to about 20 wt. %, more typically about 1 wt. % to about 10 wt. %, furthermore typically about 2 wt. % to about 7 wt. %, and most typically about 2 wt. % to about 5 wt. % of the total dry weight of the first plurality of particles and second plurality of particles combined with the water to form the aqueous gypsum slurry. For example, the first plurality of particles may be about 1 wt. % to about 5 wt. %, or about 2 wt. % to about 4 wt. % of the total dry weight of the first plurality and second plurality of particles. As used herein, "total dry weight" or "on a dry weight basis" refers to the weight of a mixture excluding any water component that may be present. "Water component" excludes the water that may be present in a gypsum crystal structure. In contrast, a "wet basis" includes water in the wt. % calculation.

The non-calcined reclaimed gypsum and second plurality of particles may be fed to a slurry mixer as separate streams to mix with water to form the aqueous gypsum slurry. In the alternative, the non-calcined reclaimed gypsum and second plurality of particles may be combined to form a combined gypsum stream and then the combined gypsum stream is fed to a slurry mixer as separate streams to mix with water to form the aqueous gypsum slurry. In either case, the aqueous gypsum slurry may be formed into new gypsum materials suitable for use as building materials. For example, new gypsum panels of varying widths and thicknesses may be manufactured by methods known in the art. Water, and optionally one or more additives, are fed to make the aqueous gypsum slurry either separately or with one or more of the first plurality of particles and the second plurality of particles.

Preferably the method comprises combining a first plurality of particles comprising the hydrophobic additive and calcium sulfate dihydrate, the first plurality of particles having a D50 particle size of about 200 μm to about 800 μm (herein "first plurality of particles") with a second plurality of particles comprising calcium sulfate hemihydrate to form a combined gypsum mixture.

Notably, the first plurality of particles is not calcined prior to combining with the second plurality of particles to form the combined gypsum mixture. Thus, as used herein, "non-calcined reclaimed gypsum" refers to this first plurality of particles comprising calcium sulfate dihydrate and the hydrophobic additive. The second plurality of particles comprising calcium sulfate hemihydrate may have a D50 particle size typical of that in drywall manufacture (e.g., about 10 μm to about 100 μm) and may be obtained from raw mined gypsum, synthetic gypsum (for example waste material from flue gas desulfurization), or may be reclaimed, and then calcined.

Embodiments of the invention may comprise using a foaming agent. In some embodiments, the foaming agent does not include alpha-sulfo fatty acid di salts.

FIG. 1 illustrates one method by which waste gypsum material may be processed. The gypsum waste can be leftovers, waste or unused/non-usable gypsum board products and/or broken parts thereof. The broken parts may be parts that are incidentally and/or purposively broken gypsum products, in particular gypsum boards or (larger) broken parts thereof. The gypsum waste may comprise a gypsum layer of the gypsum material and may or may not contain at least one facer sheet, wherein the gypsum layer comprises at least about 50 wt. % calcium sulfate dihydrate and about 0.05 wt. % to about 10 wt. % hydrophobic material. In general, suitable gypsum waste, that may be reclaimed according to the processes disclosed herein, have a total organic content equal to or less than about 6.4 wt. % with a total paper fiber content not exceeding about 5.5 wt. %.

As obtained, a feed of gypsum waste such as gypsum drywall and/or broken parts thereof may be obtained as, or processed to be, coarse gypsum, namely large chunks and coarse pieces, and therefore be processed easier by crushing larger pieces into smaller fragments. Crushing may be carried out by methods known in the art, for example, the incoming material may be reduced in size using a shredder; crusher; bucket crusher; excavator with grapple; or simply driven over with a front end loader. Optionally, non-gypsum board material (e.g., nails and/or other refuse) may be separated at 104 to ensure these materials do not pass to the next step of processing. The coarse gypsum fragments 106 may then be fed into a grinding stage 112 to break the coarse gypsum fragments 106 into gypsum particles 116. These coarse fragments 106 may be, for example, smaller than about 10 inches, typically smaller than about 5 inches, preferably fragments smaller than about 2 inches in a crushing stage 104. For example, the gypsum waste 106 may be crushed to be coarse material having a size of less than about 5 inches, for example 0.5 to 5 inches or about 0.5 inch to 2 inches.

The gypsum waste 102 typically has a front and/or rear facer sheet. Typical facer sheet is a paper facer sheet or a woven or non-woven fibrous mat facer sheet, for example, woven or non-woven glass mat. The crushing 104 may cause some facer material (e.g., paper, glass mat) to separate from coarse gypsum fragments (e.g., the gypsum core of a gypsum board). However, some or all of the separated facer material 114 is typically removed as separated facer sheet by an appropriate shearing and grinding machine in the grinding stage 112, such as a separator with a paddle blade screw conveyor enclosed in a grinding screen, that removes facer sheet for disposal or reuse and grinds the remaining gypsum to gypsum particles 116.

The grinding stage 112 may be operated under conditions sufficient to remove the facer sheets and to impart to a majority of the gypsum particles 116 exiting the grinding stage 112 a D50 particle size of about 200 μm to about 800 μm, preferably about 300 μm to about 500 μm, for example about 400 μm. Any grinding equipment may be used and one of skill in the art will be able to vary experimental parameters of the mechanical sizing equipment to determine the proper speed, force, and time to generate gypsum particles 116 having the desired particle size. For example, the above-mentioned separator with a paddle blade screw conveyor enclosed in a grinding screen may be used. The grinder 112 may be equipped with one or more screens 113 that allow particles with the desired size (e.g., 200 μm to 800 μm) to pass through the screens 113 and be conveyed to a collection bin 118 as a plurality of reclaimed gypsum particles 116 having a D50 particle size of about 200 μm to about 800 μm.

Figure 2:
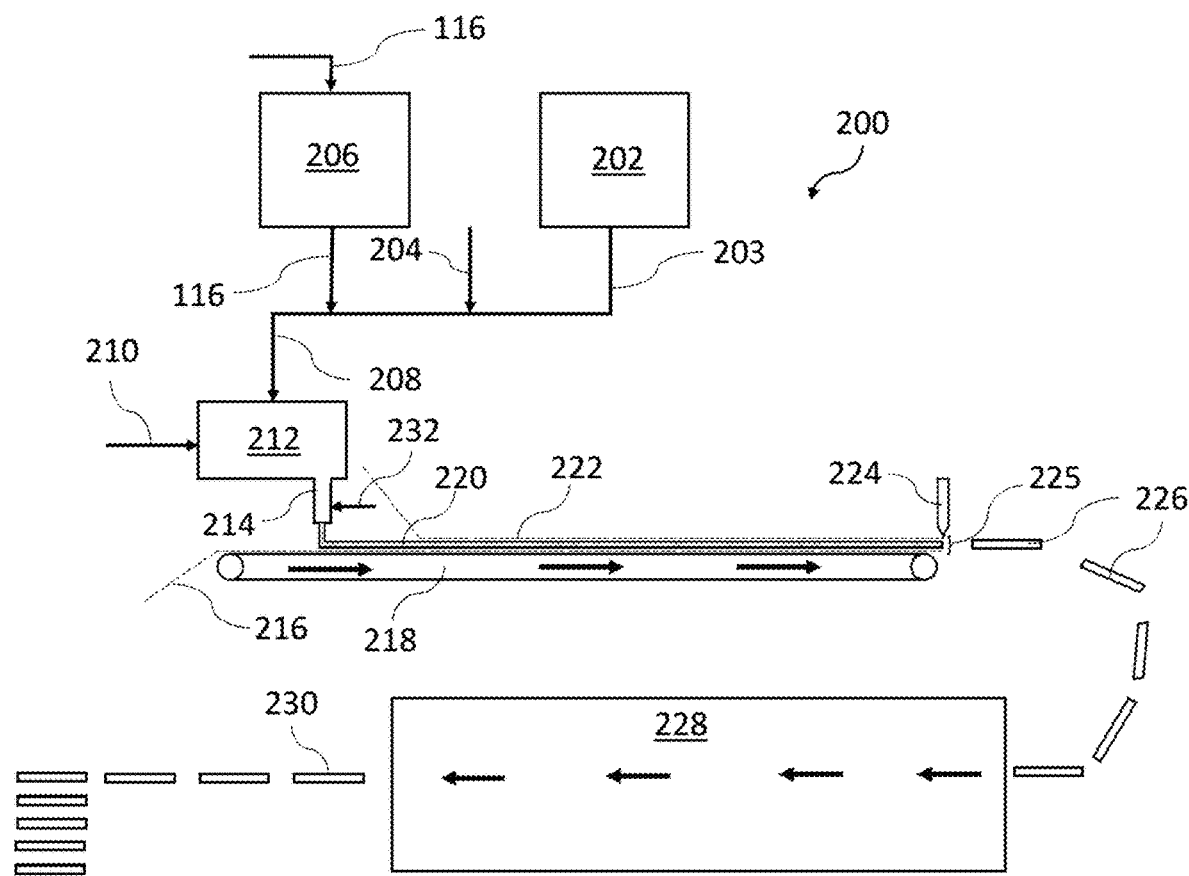
FIG. 2 provides one process by which gypsum products may be manufactured using reclaimed gypsum.

Reclaimed gypsum 116 may then be conveyed to a drywall manufacturing assembly line, such as that shown in FIG. 2. FIG. 2 depicts an example wall board assembly line 200 with a first hopper 206 to receive the reclaimed uncalcined gypsum 116 from the process depicted in FIG. 1. A second hopper 202 may contain calcium sulfate hemihydrate, obtained either from raw gypsum ("virgin gypsum") or as reclaimed gypsum that has been calcined. The reclaimed gypsum 116, the calcium sulfate hemihydrate (virgin dehydrated gypsum or calcined reclaimed gypsum) 203, together with any desired dry additives 204 may be conveyed through a conduit 208 to a mixer 212. The introduction of each component into the conduit 208 may be facilitated by a metered feeder (not shown). Optionally and alternatively, the calcium sulfate hemihydrate 203 may be fed directly into the mixer 212 through a second conduit (not shown in FIG. 2), separate from conduit 208 which conveys the reclaimed gypsum 116 to the mixer. One of ordinary skill in the art would be able to visualize and easily employ this alternative manufacturing design. Water 210 and any desired wet additives may be added to the mixer 212 to produce an aqueous gypsum slurry.

Separately, a forming table 218 may feed a continuous forming surface 216 (e.g., paper, woven fiber or non-woven fiber suitable as a front or back facer sheet) underneath a discharge port 214 of the mixer 212. The discharge port 214 deposits and spreads the gypsum slurry 220 over the forming surface 216. The gypsum slurry 220, when set, will become the gypsum core of the gypsum board. Air or foam may be added to the gypsum slurry 220 by injecting air or foam through a conduit 232 into the aqueous gypsum slurry passing through the discharge port 214 (e.g., in the gate as described, for example, in U.S. Pat. Nos. 5,683,635 and 6,494,609).

Downstream from the discharge port 214, a continuous facer sheet layer 222 (e.g., paper, woven fiber or non-woven fiber suitable as a front or back facer sheet) is placed over the gypsum slurry 220 to create a layered preform assembly 225. The layered preform assembly 225 is cut to a desired length using a cutting tool 224 (for example a knife) into preformed panels 226. The preformed panels 226 may then passed be through a kiln 228 to dry the aqueous gypsum slurry and set the preformed gypsum panels 226, which emerge as fully set gypsum panels 230. A fully set gypsum panel will comprise, as a front surface, the forming surface 216, a core gypsum layer formed from the gypsum slurry 220, and a back surface formed from the backing layer 222.

It is common in the manufacture of cementitious building panels such as gypsum panels for a core gypsum layer to further comprise one or more dense thin layers of gypsum slurry, herein called a "skim layer." Thus, a relatively more dense layer of gypsum slurry that will form a skim layer may be deposited onto a forming surface 316 (FIG. 3) before depositing a gypsum slurry, that is relatively less dense than the slurry for making the skim layer, will form the majority of the gypsum core (herein "primary gypsum slurry").

Figure 3:
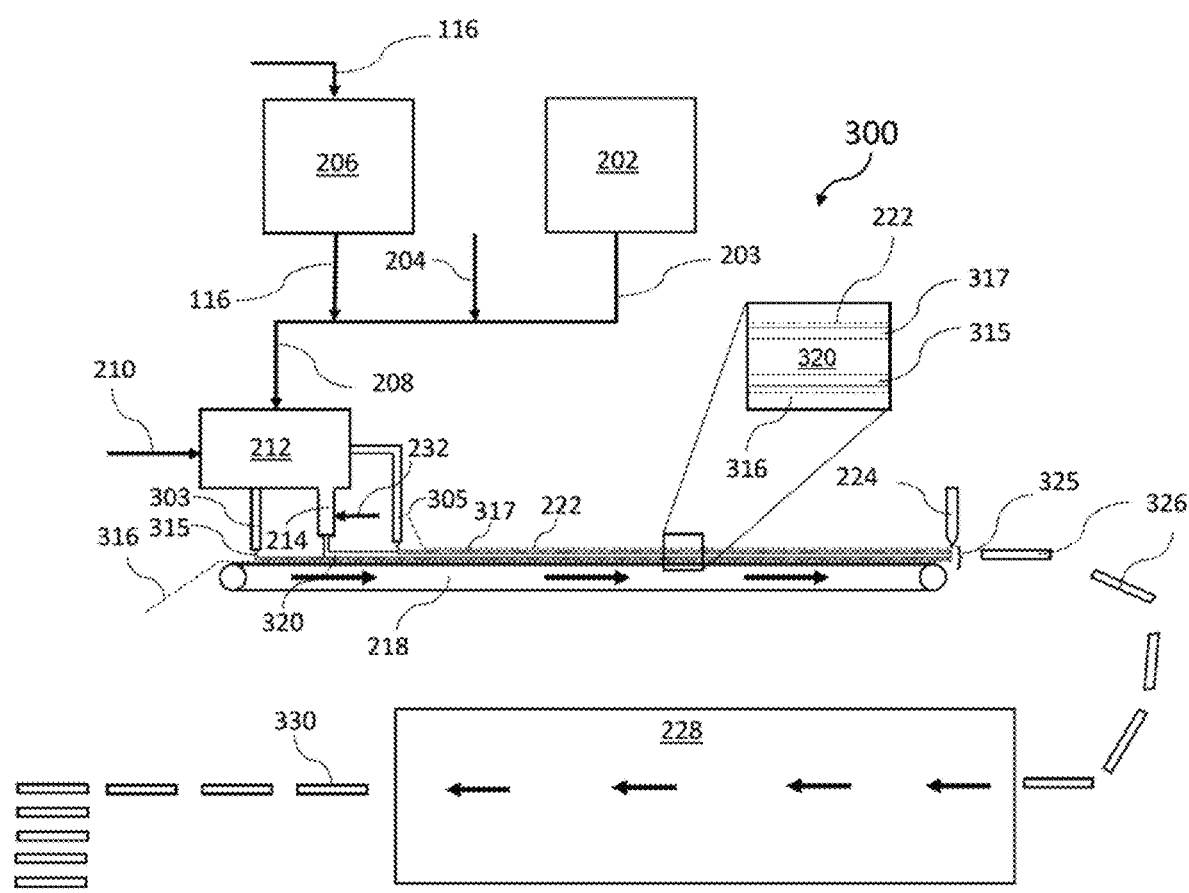
FIG. 3 shows a diagrammatic side view of an example of a wet end of a continuous manufacturing line for producing a gypsum panel of embodiments of the invention having a gypsum core between glass mat facer sheets.

FIG. 3, where all like numbers represent the same elements as depicted in FIG. 2, depicts such a process 300. A portion of the gypsum slurry discharged from the mixer 212 may be diverted through one or more pressurized slurry lines 303, 305, exiting through a smaller exit port to form a first skim layer gypsum slurry 315 on the forming surface 316. Additives, if desired, may be injected in wet form into the pressurized slurry line/s 303, 305 through injection ports. The pressurized slurry line/s 303, 305 are desirably long enough to allow for uniform mixing of slurry and additives. The forming surface 316 may be paper or may be a nonwoven glass fiber cover sheet, for example, as used in a layered tile backer panel or exterior sheathing panel. The primary gypsum slurry 320 that will, when set, form the majority of the core of the gypsum board may be applied atop the first skim layer gypsum slurry 315 through the discharge port 214. As described above with respect to FIG. 2, the primary gypsum slurry 320 may be foamed by injecting foam or air through a conduit 232. Optionally, a second skim layer gypsum slurry 317 may be deposited atop the primary gypsum slurry 320. A backing (facer) material 222, for example, paper or a second layer of nonwoven glass fiber cover sheet material, may be applied to the second skim layer gypsum slurry 317 (or to the core gypsum slurry if a second skim layer is not desired) and passed through forming station to compress the layers into a desired total thickness (e.g., about 0.25 inch to about 1.5 inch thick, preferably about 0.25 inch to about 1.0 inches thick. The resultant structure is a gypsum board preform 325.

If the primary gypsum slurry 320 for the core layer is foamed, the first and second skim layer gypsum slurries 315, 317 may be not foamed, or foamed to a lesser extent, to be relatively denser and thinner than the foamed primary gypsum slurry. Thus, the aqueous slurry for the first and second skim layer gypsum slurries may or may not be subjected to the air or foam that may be added to the primary gypsum slurry 320. The primary gypsum slurry 320 may be foamed by injecting air or foam through the conduit 232 into the aqueous gypsum slurry passing through the discharge port 214.

When foamed, the portion of the gypsum core resulting from the set foamed primary gypsum slurry may have a total air bubble volume of about 30 vol. % to about 90 vol. %, preferably an air bubble volume of about 45 vol. % to about 80 vol. %. The first skim layer and second skim layer (if present) resulting from setting the first and second skim layer gypsum slurries may have a total air bubble volume of about 30 vol. % or less, preferably about 10 vol. % or less. The air bubbles in the gypsum core may have an average cross-section diameter of less than 1.5 mm, preferably about 0.5 to about 0.8 mm, more preferably about 0.3 mm.

Typically the first and second skim slurries 315, 317 have the same composition and density. However if desired, the first and second skim layer slurries 315, 317 can have different compositions and/or densities. FIG. 3 shows all gypsum slurries 320, 315, 317, coming from the same mixer 212. However, each gypsum slurry 320, 315, 317 can come from different mixers to have different properties, such as different densities.

The calcium sulfate particles in each gypsum slurry 320, 315, 317, when combined with water, may react with the water and set as the gypsum panel preform 325 moves along a manufacturing line. The gypsum panel preform 325 may be dried and cut into segments 326 of predetermined dimensions at a point along the line where the panel preform 325 for the gypsum panel has set sufficiently. The segments 326 can be flipped over, dried 228 (e.g., in a kiln) to remove excess water, and processed to provide the final layered wallboard 330 of desired dimensions. The combined thickness of gypsum core (which includes optional skim layers) resulting from the set gypsum slurries 320, 315, 317 may be generally about 0.25 inches to about 1.5 inches. The combined density may be about 15 pounds/cubic foot to about 65 pounds/cubic foot, more typically 25 pounds/cubic foot to about 65 pounds/cubic foot, for example 25 pounds/cubic foot to 55 pounds/cubic foot.

The gypsum material may be processed in the same manner as described above, bypassing any calcination and thereby reducing the overall energy required to recycle the gypsum.

Advantageously, the methods described herein allow reclamation of otherwise unsuitable gypsum materials for reuse in new products. In particular, gypsum particles, even upon being size-reduced, may still contain and be coated in the one or more of the hydrophobic additives present in the solid layer from which the particles were formed which herein before now has posed incompatible for incorporation into an aqueous gypsum slurry for drywall manufacture, particularly in drywalls comprising foam components. Previous attempts have revealed that hydrophobic-containing gypsum particles break the walls of air bubbles, resulting in loss of slurry stability. Surprisingly, it has been found that use of a larger particle size larger than typically used in gypsum recycling, namely a D50 particle size of about 200 μm to about 1000 μm, preferably about 200 μm to about 800 μm, mitigates much of the incompatibility. Further, these particles need not be calcined. It has thus been found that reclaimed non-calcined gypsum may be incorporated into an aqueous gypsum slurry at a non-trivial percentage (e.g., up to about 10 wt. % or even more) thereby effectively recycling hereto before unusable gypsum waste.

In particular, gypsum drywall comprising hydrophobic components, would otherwise be discarded, may be recycled into new drywall having properties that conform to ASTM standard C1396/C1396M-17. Various properties such as flexural strength, hardness (core, end, and edge), nail pull resistance, humidified deflection, end squareness, nominal thickness, recessed- or tapered-edge depth, width, length, water resistance of core-treated water repellant gypsum panel products, and surface water resistance of gypsum panel products with water-repellent surfaces, may be determined such as described in ASTM C473-19.

All documents described herein are incorporated by reference herein for purposes of all jurisdictions where such practice is allowed, including any priority documents and/or testing procedures to the extent that they are not inconsistent with this text. As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more of the element that it introduces.

As used in this disclosure, "NP" refers to nail pull strength.

"MT" refers to products containing siloxane.

"GM" means gypsum obtained from gypsum waste having a gypsum core comprising siloxane and coated in fiberglass. More particularly, the type "GM" gypsum particles described in the non-limiting examples of this disclosure had the following particle size distribution characteristics: about 15.2 wt. % of particles were larger than 840 μm, about 52.2 wt. % of particles were sized between 300 μm and 840 μm, about 19.0 wt. % of particles were sized between 150 μm and 300 μm, and about 12.0 wt. % of particles were smaller than 150 μm. These particles had a D50 particle size in the range of about 200 μm to about 800 μm.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related, and other constraints, which vary by implementation and from time to time. While a developer's efforts might be time-consuming, such efforts would be, nevertheless, a routine undertaking for one of ordinary skill in the art and having benefit of this disclosure.

To facilitate a better understanding of the embodiments of the present invention, the following examples of preferred or representative embodiments are given. In no way should the following examples be read to limit, or to define, the scope of the invention.

Clauses of the Invention

The following clauses disclose various aspects of the invention.

Clause 1. A method for making a gypsum board comprising:
  combining water, a first plurality of particles comprising at least about 50 wt. % calcium sulfate dihydrate and about 0.05 wt. % to about 10 wt. % hydrophobic material and having a D50 particle size of about 200 μm to about 800 μm, and a second plurality of particles comprising calcium sulfate hemihydrate to make an aqueous gypsum slurry;
  depositing a core layer comprising the aqueous gypsum slurry over a forming surface; and
  allowing the core layer to set, thereby forming a set gypsum core.

Clause 2. The method of Clause 1, wherein the first plurality of particles is combined with the second plurality of particles to form a combined mixture of calcium sulfate, and
  the water is added to the combined mixture of calcium sulfate to make the aqueous gypsum slurry.

Clause 2. The method of Clause 1, wherein the hydrophobic material comprises siloxane.

Clause 3. The method of clause 1, wherein the first plurality of particles is combined with the second plurality of particles to form a combined dry mixture of calcium sulfate and the water is added to the combined dry mixture of calcium sulfate to make the aqueous gypsum slurry.

Clause 4. The method of any of clauses 1 to 3, wherein the hydrophobic material comprises siloxane.

Clause 5. The method of any of clauses 1 to 3, wherein the hydrophobic material comprises wax.

Clause 6. The method of any of clauses 1 to 3, wherein the hydrophobic material comprises one or more of siloxane, wax, and resin.

Clause 7. The method of any preceding clause, wherein the first plurality of particles have a D50 particle size of about 300 μm to about 500 μm.

Clause 8. The method of any preceding clause, further comprising subjecting a gypsum waste (typically a gypsum board and/or broken parts thereof) comprising a gypsum feed material, the gypsum feed material comprising at least about 50 wt. % calcium sulfate dihydrate and about 0.05 wt. % to about 10 wt. % hydrophobic material, to a size reduction process to generate the first plurality of particles.

Clause 9. The method of clause 8, wherein the size reduction process comprises crushing the gypsum waste to form fragments having a dimension of 10 inches or less, preferably 5 inches or less, and grinding the fragments to generate the first plurality of particles.

Clause 10. The method of any preceding clause, wherein the gypsum feed material comprises a gypsum layer and at least one facer sheet, wherein the gypsum layer comprises at least about 50 wt. % calcium sulfate dihydrate and about 0.05 wt. % to about 10 wt. % hydrophobic material, wherein the gypsum feed material comprises gypsum board comprising at least one facer sheet.

Clause 11. The method of clause 10, wherein the at least one facer sheet comprises at least one of a glass mat facer sheet or a paper facer sheet.

Clause 12. The method of clause 11, wherein the size reduction process at least partially removes, or totally removes the at least one facer sheet from the gypsum layer.

Clause 13. The method of clause 11, wherein the size reduction process comprises crushing the gypsum waste to form fragments having a dimension of 10 inches or less, preferably 5 inches or less, and grinding the fragments to the D50 particle size of about 200 µm to about 800 µm, preferably about 300 µm to about 500 µm, and removes the at least one facer sheet from the gypsum layer.

Clause 14. The method of any preceding clause, wherein the set gypsum core comprises air bubbles.

Clause 15. The method of any preceding clause, wherein the set gypsum core comprises air bubbles, wherein the air bubbles have an average cross-section diameter of less than 1.5 mm, about 0.5 to about 0.8 mm, about 0.3 mm, or about 0.3 mm or less.

Clause 16. The method of any of the preceding clauses, wherein the depositing the core layer over the forming surface comprises:

depositing a first portion of the aqueous gypsum slurry on the forming surface as a skim layer; and depositing a second portion of the aqueous gypsum slurry on the skim layer as a primary gypsum layer; and allowing the skim layer and the primary gypsum layer to dry, thereby forming a set gypsum core.

Clause 17. The method of any preceding clause, wherein the aqueous gypsum slurry comprises about 0.1 wt. % to about 20 wt. % of the first plurality of particles based on the combined dry weight of the first plurality of particles and second plurality of particles.

Clause 18. The method of any preceding clause, wherein the hydrophobic material comprises siloxane and wherein the first plurality of particles comprises about 0.05 wt. % to about 5 wt. %, typically 0.1 wt. % to about 3 wt. %, of said siloxane.

Clause 19. The method of any preceding clause, wherein the hydrophobic material comprises wax and wherein the first plurality of particles comprises about 0.5 wt. % to about 10 wt. %, typically 1 wt. % to about 7 wt. %, for example, about 3 wt. % to about 7 wt. % of said wax.

Clause 20. The method of any preceding clause, wherein the aqueous gypsum slurry comprises about 1 wt. % to about 10 wt. % of the first plurality of particles based on the combined dry weight of the first plurality of particles and second plurality of particles.

Clause 21. The method of any preceding clause, wherein the aqueous gypsum slurry comprises about 2 wt. % to about 7 wt. % of the first plurality of particles based on the combined dry weight of the first plurality of particles and second plurality of particles.

Clause 22. The method of any preceding clause, wherein the aqueous gypsum slurry comprises about 2 wt. % to about 5 wt. % of the first plurality of particles based on the combined dry weight of the first plurality of particles and second plurality of particles.

Clause 23. The method of any preceding clause, further comprising adding air to the aqueous gypsum slurry prior to depositing it.

Clause 24. The method of any preceding clause, wherein the set gypsum core has a total air volume of about 30 vol. % to about 90 vol. %.

Clause 25. The method of clause 24, wherein the total air volume of the set gypsum core is about 45 vol. % to about 80 vol. %.

Clause 26. The method of any preceding clause, wherein the set skim layer has a total air volume of about 30 vol. % or less.

Clause 27. The method of any preceding clause, wherein the set skim layer has a total void volume of about 10 vol. % or less.

Clause 28. A method for making a gypsum board comprising:

combining water, a first plurality of particles comprising at least about 50 wt. % calcium sulfate dihydrate and about 0.05 wt. % to about 10 wt. % hydrophobic material and at least about 98 wt. % of the first plurality of particles have a particle size of about 100 µm to about 3000 µm, and a second plurality of particles comprising calcium sulfate hemihydrate to make an aqueous gypsum slurry;

depositing a core layer comprising the aqueous gypsum slurry over a forming surface; and allowing the core layer to set, thereby forming a set gypsum core.

EXAMPLES

Table 1 below describes the manufacture of four different drywall products using various amounts of siloxane-containing non-calcined reclaimed gypsum. Two types of waste product were processed to obtain non-calcined reclaimed gypsum.

Type "MT" gypsum was obtained from gypsum waste having a gypsum core comprising siloxane and coated in paper. More particularly, the type "MT" gypsum particles had the following particle size distribution characteristics: about 23.6 wt. % of particles were larger than 840 µm, about 41.1 wt. % of particles were sized between 300 µm and 840 µm, about 20.0 wt. % of particles were sized between 150 µm and 300 µm, and about 14.2 wt. % of particles were smaller than 150 µm. A trace amount (e.g., about 1.5 wt. % or less) of paper and/or fiberglass may also be mixed with the plurality of reclaimed gypsum. These particles had a D50 particle size in the range of about 200 µm to about 800 µm.

Type "GM" gypsum was obtained from gypsum waste having a gypsum core comprising siloxane and coated in fiberglass. More particularly, the type "GM" gypsum particles had the following particle size distribution characteristics: about 15.2 wt. % of particles were larger than 840 µm, about 52.2 wt. % of particles were sized between 300 µm and 840 µm, about 19.0 wt. % of particles were sized between 150 µm and 300 µm, and about 12.0 wt. % of particles were smaller than 150 µm. These particles had a D50 particle size in the range of about 200 µm to about 800 µm.

Manufactured product "A" is ⅝-inch fire-resistant fiberglass-reinforced type X gypsum board encased in paper. Product "B" is ⅝-inch fire-resistant fiberglass-reinforced type X gypsum board encased moisture- and mold-resistant paper. Product "C" is ½-inch lightweight gypsum panel. Product "D" is 1-inch fire-resistant fiberglass-reinforced type X gypsum board encased in fiberglass.

TABLE 1

| Product | Ex. | Non-calcined Type "MT" | Non-calcined Type "GM" | Results Nail Pull (lb$_f$) | Comments |
|---|---|---|---|---|---|
| A | 1 | 0 | 0 | 107.7 | control |
| A | 2 | 0.7 | 1.3 | 110.7 | performed |
| A | 3 | 0.7 | 2.2 | 113.4 | similarly or better in nail pull than control |
| B | 4 | 0 | 0 | 108.1 | control |
| B | 5 | 0.7 | 1.3 | 114.3 | performed |

TABLE 1-continued

| Product | Ex. | Non-calcined Type "MT" | Non-calcined Type "GM" | Results Nail Pull (lb_f) | Comments |
|---|---|---|---|---|---|
| B | 6 | 0.7 | 2.2 | 111.9 | similarly or better in nail pull than control |
| C | 7 | 0 | 0 | 77.2 | control |
| C | 8 | 0 | 2 | 78.8 | performed |
| C | 9 | 0 | 3.4 | 81.4 | similarly or better in nail pull than control |
| D | 10 | 0 | 0 | n/a | control |
| D | 11 | 0 | 0.8 | n/a | No effect |

Products "A," "B," "C," and "D" above were successfully prepared with the properties described in Table 2 below.

TABLE 2

| Product | Thickness (inches) | Density (lbs/ft³) |
|---|---|---|
| A | 0.625 | 43.7 |
| B | 0.625 | 43.6 |
| C | 0.495 | 33.7 |
| D | 1 | 50.5 |

Previously, attempts to use hydrophobic-containing gypsum particles have failed due to the defoaming properties of the hydrophobic-containing gypsum particles which cause the gypsum slurry, 220 in FIG. 2, and 320 in FIG. 3, to collapse and prevent formation of a preform gypsum core 225 in FIG. 2 and FIG. 3 resulting in stoppage of the drywall manufacturing process. A collapsed gypsum core has total void (or air bubble) volume less than about 30%. During manufacture of these examples, no apparent defoaming and collapse of gypsum core was Gbserved when manufacturing type "A," "B," "C," and "D" product boards when employing the reclaimed gypsum particles having a particle size in the range from 200 μm to 800 μm. In some instances, increasing the total soap which increased the strength of the walls of the air bubbles amount of air bubbles effectively counter-balance any defoaming actions by hydrophobic-containing gypsum particles and prevented the collapse of gypsum core, which allowed the continuous operation of drywall manufacturing process.

After drying, the properties of the resulting boards in the different trials described above had no visible defects compared to the controls (namely, Example Nos. 1, 4, 7, and 10). Boards made with reclaimed non-calcined gypsum had essentially the same properties, such as nail pull, as the boards made with calcined materials as shown in Table 1.

Figure 4:
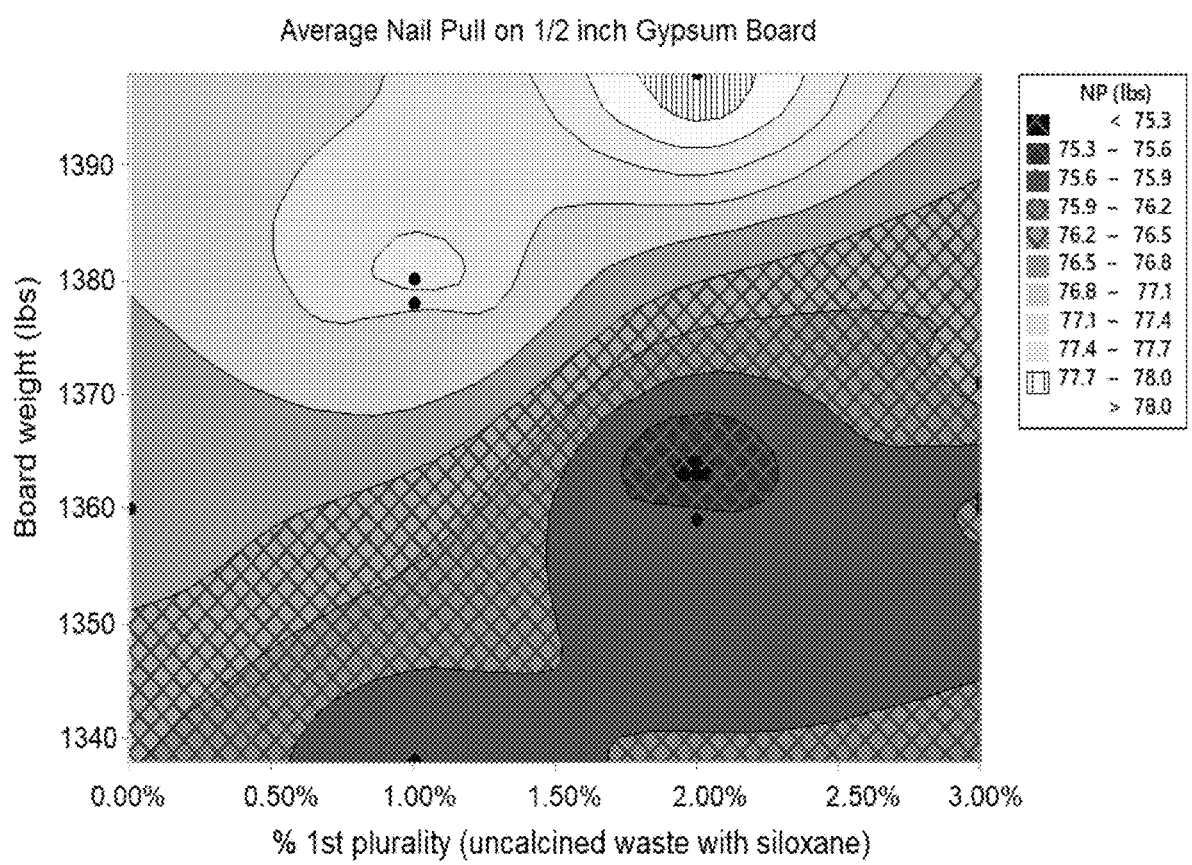
FIG. 4 shows the average NP (nail pull) under various trial conditions.

FIG. 4 shows the nail pull strength of boards made in accordance with the invention. Gypsum boards made with ½ inch thickness (comprising a core and a top and bottom coversheet) were prepared with various amounts of uncalcined waste. The figure shows that nail pull strength is not statistically different from the control. The control contains 0% of the first plurality and has a weight of 1360 lbs per 1000 square feet of the ½ inch board.

Therefore, the present disclosure is well adapted to attain the ends and advantages mentioned as well as those that are inherent therein.

The particular disclosure above is illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below.

We claim:

1. A method for making a gypsum board comprising:
   depositing a core layer comprising an aqueous gypsum slurry over a forming surface;
   wherein non-calcined reclaimed gypsum particles in the aqueous gypsum slurry consist of non-calcined reclaimed gypsum particles with a D50 particle size of about 200 μm to about 800 μm, and wherein the non-calcined reclaimed gypsum particles comprise at least about 50 wt. % calcium sulfate dihydrate and about 0.05 wt. % to about 10 wt. % hydrophobic material;
   wherein the aqueous gypsum slurry is made by combining water, and
   the non-calcined reclaimed gypsum particles and calcined gypsum particles comprising calcium sulfate hemihydrate; and
   allowing the core layer to set, thereby forming a set gypsum core.

2. The method of claim 1, wherein the non-calcined reclaimed gypsum particles are combined with the calcined gypsum particles to form a combined dry mixture and the water is added to the combined dry mixture to make the aqueous gypsum slurry.

3. The method of claim 1, wherein the aqueous gypsum slurry does not include alpha-sulfo fatty acid di salts.

4. The method of claim 1, wherein the hydrophobic material comprises one or more of siloxane, wax, and resin, wherein the gypsum board is a drywall gypsum board, wherein the method further comprises placing a first facer sheet on the forming surface, wherein the core layer is deposited on the first facer sheet, and further comprising placing a second facer sheet over the deposited core layer such that the core layer sets between the first and second facer sheet, thereby forming the gypsum board to comprise the set gypsum core, the first facer sheet and the seconds facer sheet, wherein each said facer sheet is selected from the group consisting of a glass mat facer sheet and a paper facer sheet.

5. The method of claim 1, wherein the non-calcined reclaimed gypsum particles have a D50 particle size of about 300 μm to about 500 μm.

6. The method of claim 1, further comprising subjecting a gypsum waste comprising a gypsum feed material to a size reduction process to generate the non-calcined particles, the gypsum feed material comprising:
   A) at least about 50 wt. % calcium sulfate dihydrate and
   B) hydrophobic material,
   wherein the gypsum feed material comprises gypsum board comprising a gypsum layer and at least one facer sheet, wherein the gypsum layer comprises at least about 50 wt. % calcium sulfate dihydrate and about 0.05 wt. % to about 10 wt. % hydrophobic material.

7. The method of claim 6, wherein the at least one facer sheet comprises at least one of a glass mat facer sheet and a paper facer sheet.

8. The method of claim 6, wherein the size reduction process at least partially removes the at least one facer sheet from the gypsum layer.

9. The method of claim 1, wherein the set gypsum core comprises air bubbles, wherein the air bubbles have an average cross-section diameter of less than 1.5 mm.

10. The method of claim 1, wherein the depositing the core layer over the forming surface comprises:

depositing a first portion of the aqueous gypsum slurry on the forming surface as a skim layer; and depositing a second portion of the aqueous gypsum slurry on the skim layer as a primary gypsum layer; and allowing the skim layer and the primary gypsum layer to dry, thereby forming the set gypsum core comprising a set primary gypsum layer and a set skim layer.

11. The method of claim 1, wherein the aqueous gypsum slurry comprises about 0.1 wt. % to about 20 wt. % of the non-calcined reclaimed gypsum particles based on a combined dry weight of the non-calcined reclaimed gypsum particles and the calcined gypsum particles.

12. The method of claim 1, wherein the hydrophobic material comprises siloxane and wherein the non-calcined reclaimed gypsum particles comprises about 0.05 wt. % to about 5 wt. %, of said siloxane.

13. The method of claim 1, wherein the hydrophobic material comprises wax and wherein the non-calcined reclaimed gypsum particles comprises about 0.5 wt. % to about 10 wt. % of said wax.

14. The method of claim 1, wherein the aqueous gypsum slurry comprises about 1 wt. % to about 10 wt. % of the non-calcined reclaimed gypsum particles based on a combined dry weight of the non-calcined reclaimed gypsum particles and the calcined gypsum particles.

15. The method of claim 1, further comprising adding air to the aqueous gypsum slurry prior to depositing it.

16. The method of claim 1, wherein the set gypsum core has a total air volume of about 30 vol. % to about 90 vol. %.

17. The method of claim 1, further comprising adding to the aqueous gypsum slurry prior to depositing the aqueous slurry at least one additive selected from the group consisting of retarders, accelerators, foaming agents, wet strength enhancing materials, biocides, sag resistant ingredients, cellulosic fibers, glass fibers, fire retarding materials, binders, water repellency ingredients, dust mitigators, and starches.

18. A method for making a gypsum board comprising:
combining
water, and
non-calcined reclaimed gypsum particles comprising at least about 50 wt. % calcium sulfate dihydrate and about 0.05 wt. % to about 10 wt. % hydrophobic material, the non-calcined reclaimed gypsum particles having a D50 particle size of about 200 μm to about 800 μm, and
calcined gypsum particles comprising calcium sulfate hemihydrate to make an aqueous gypsum slurry;
depositing a core layer comprising the aqueous gypsum slurry over a forming surface; and
allowing the core layer to set, thereby forming a set gypsum core;
wherein the non-calcined reclaimed gypsum particles and the calcined gypsum particles are fed as separate streams to a slurry mixer to mix with water to make the aqueous gypsum slurry, wherein the calcined particles are non-reclaimed.

19. A method for making a gypsum board comprising:
combining
water, and
a first plurality of non-calcined reclaimed gypsum particles comprising at least about 50 wt. % calcium sulfate dihydrate and about 0.05 wt. % to about 10 wt. % hydrophobic material, the first plurality of particles having a D50 particle size of about 200 μm to about 800 μm and
a second plurality of calcined gypsum particles comprising calcium sulfate hemihydrate to make an aqueous gypsum slurry;
depositing a core layer comprising the aqueous gypsum slurry over a forming surface; and
allowing the core layer to set, thereby forming a set gypsum core,
wherein total air volume of the set gypsum core is about 45 vol. % to about 80 vol. %.

20. A method for making a gypsum board comprising:
combining
water,
a first plurality of particles comprising at least about 50 wt. % calcium sulfate dihydrate and about 0.05 wt. % to about 10 wt. % hydrophobic material and at least about 98 wt. % of the first plurality of particles have a particle size of about 100 μm to about 3000 μm, and
a second plurality of particles comprising calcium sulfate hemihydrate to make an aqueous gypsum slurry;
depositing a core layer comprising the aqueous gypsum slurry over a forming surface; and
allowing the core layer to set, thereby forming a set gypsum core.

21. A method for making a gypsum board comprising:
combining
water, and
a first plurality of non-calcined reclaimed gypsum particles comprising at least about 50 wt. % calcium sulfate dihydrate and about 0.05 wt. % to about 10 wt. % hydrophobic material, the first plurality of particles having a D50 particle size of about 200 μm to about 800 μm and
a second plurality of calcined gypsum particles comprising calcium sulfate hemihydrate to make an aqueous gypsum slurry;
depositing a core layer comprising the aqueous gypsum slurry over a forming surface; and
allowing the core layer to set, thereby forming a set gypsum core,
wherein the water is combined with particles consisting of:
the first plurality of non-calcined reclaimed gypsum particles comprising at least about 50 wt. % calcium sulfate dihydrate and about 0.05 wt. % to about 10 wt. % hydrophobic material, the first plurality of particles having the D50 particle size of about 200 μm to about 800 μm and
the second plurality of calcined gypsum particles comprising calcium sulfate hemihydrate to make the aqueous gypsum slurry.

* * * * *